No. 726,753. PATENTED APR. 28, 1903.
W. B. PRESTON.
CHURN.
APPLICATION FILED JAN. 24, 1902.
NO MODEL. 2 SHEETS—SHEET 2.
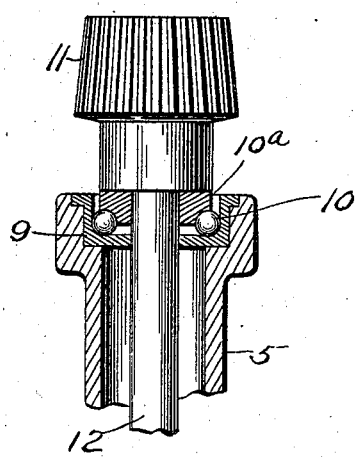
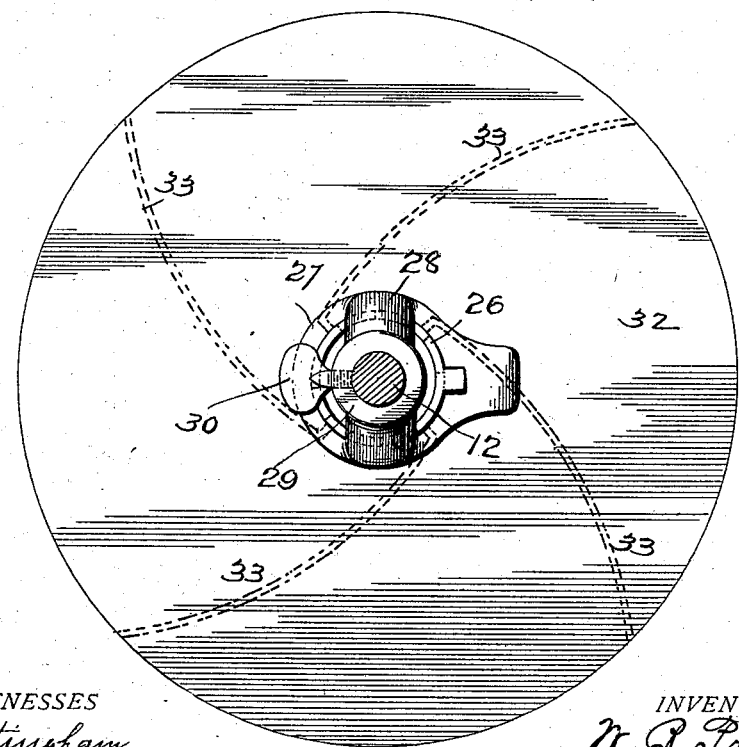

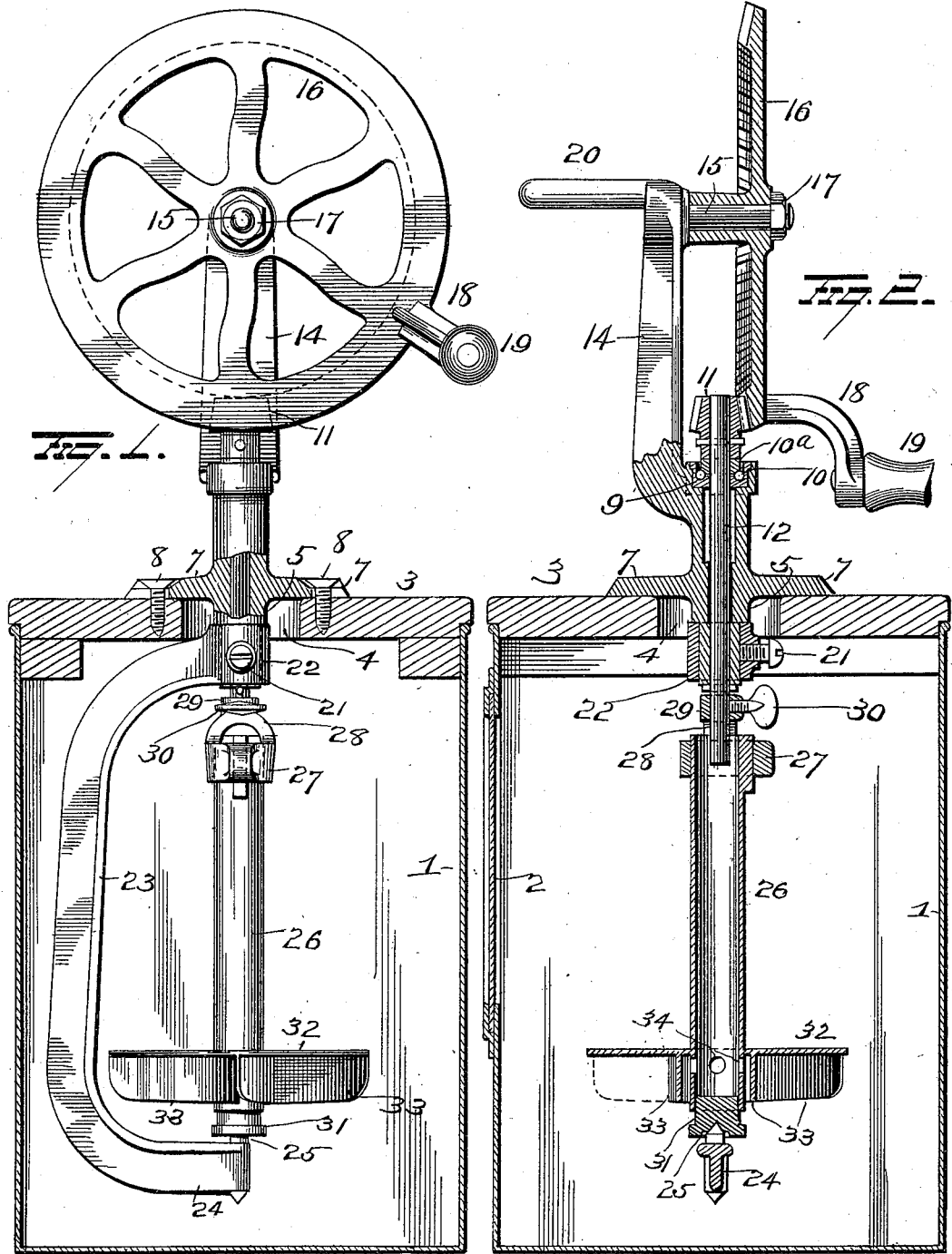

UNITED STATES PATENT OFFICE.

WILLARD B. PRESTON, OF CHICAGO, ILLINOIS.

CHURN.

SPECIFICATION forming part of Letters Patent No. 726,753, dated April 28, 1903.

Application filed January 24, 1902. Serial No. 91,046. (No model.)

*To all whom it may concern:*

Be it known that I, WILLARD B. PRESTON, a resident of Chicago, in the county of Cook and State of Illinois, have invented certain new and useful Improvements in Churns; and I do hereby declare the following to be a full, clear, and exact description of the invention, such as will enable others skilled in the art to which it appertains to make and use the same.

My invention relates to an improvement in churns, the object of the invention being to provide improved mechanism for supporting an aerating rotary dasher in a receptacle and so construct and mount the gearing and framework as to secure the best possible results from a churn of this character.

With this object in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a view in section of the same, and Figs. 3 and 4 are enlarged views of details of construction.

1 represents a can or receptacle, which may be rectangular or other shape and is preferably provided in one side with a glass or transparent plate 2 to permit the contents of the receptacle to be viewed at all times. The top 3 for this receptacle is made to fit snugly and firmly in the receptacle and is made with a central opening 4, through which projects a metal sleeve 5, forming a part of a cast framework. On sleeve 5 radially-projecting arms 7 are located and are made bifurcated at their ends to receive screws 8 and firmly secure the framework to the top or cover 3. The upper end of sleeve 5 is enlarged, forming an internal shoulder, on which a ring 9 is mounted and forms a runway for ball-bearings 10, on which latter the beveled lower edge of a ring 10ª, held against the hub of a bevel-gear 11, is supported to turn. This bevel-gear 11 is secured on a shaft 12, extending down through the sleeve 5 and adapted to have the tubular dasher-rod 26 secured thereon, as will be hereinafter explained. On one side of the sleeve 5, at its upper end, a vertical arm or standard 14 is located and has a pintle 15 at its upper end, on which a large bevel-gear 16 is mounted to revolve and is secured on the pintle by means of a nut 17, screwed onto the outer end thereof. A crank-arm 18 and handle 19 are provided on gear 16 to readily turn the same, and a rigid handhold 20 is provided at the upper end of standard 14 to steady the churn during its operation. The lower end of sleeve 5, which projects into the receptacle, is preferably contracted, as shown, and has secured thereon by a screw 21a a collar 22, forming an integral part of a bowed leg 23, projecting to near the bottom of the receptacle and terminating in a foot 24, having an upright conical lug or pin 25 in alinement with the shaft 12 to form a thrust-bearing for the lower end of the dasher-rod, as will hereinafter appear.

The dasher-rod 26 comprises a tube of any desired diameter, secured in a ring 27 by a key on the rod 26 and a keyway in said ring, and the ring is made with an integral yoke 28, having a central collar 29 to fit the shaft 12 and be secured thereon by a set-screw 30. This rod 26 has located in its lower end a flanged plug 31, made with a conical recess in its bottom to receive pin 25 and rotate thereon. The dasher proper consists of a metal disk 32, perforated centrally to receive the dasher-rod 26 and is rigidly secured thereon and has secured to its lower face the upper edges of a series of curves, strips, or blades 33, which latter are bent sharply at their inner ends and secured to the rod 26. Openings 34 are provided in rod 26 between the blades 33 to permit the air drawn down the tubular rod to be ejected by the blades into the cream and butter.

It will be seen that with my improvements the dasher is supported solely by the framework and leg 23 and does not come in contact with the receptacle at all. This permits the easy removal of all of the working parts from the receptacle, and as I do not employ any bearing in the bottom of the receptacle there will be no dark streaks in the cream and butter due to this bearing, as heretofore.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a churn, the combination with a receptacle and a cover therefor, of a sleeve projecting through the cover, a drive-shaft therein, a leg secured to the sleeve in the receptacle and terminating at its lower end in a foot projecting beneath the shaft, a tubular dasher-rod, a plug in the lower end thereof having a thrust-bearing on said foot, a yoke connecting the upper end of said tubular rod to the shaft, a dasher on the lower end of said dasher-rod comprising a horizontal disk and a series of curved strips or blades secured to the lower face of said disk and the rod perforated between said strips or blades to permit the air to be drawn therethrough.

2. In a churn, the combination with a receptacle and a cover therefor having a hole, of a frame mounted on the cover over said hole, a shaft passing through said frame and entering the receptacle, a tube secured to the lower end of said shaft, said tube having holes near its lower end, blades secured to said tube adjacent to the holes therein, means for supporting the lower end of the tube and gearing mounted in the frame on the cover for driving the shaft and the tube and blades connected therewith.

In testimony whereof I have signed this specification in the presence of two subscribing witnesses.

WILLARD B. PRESTON.

Witnesses:
C. H. RADCLIFFE,
MARK R. SHERMAN.